United States Patent
Faigle

[19]

[11] Patent Number: 6,053,571
[45] Date of Patent: Apr. 25, 2000

[54] VEHICLE OCCUPANT PROTECTION APPARATUS

[75] Inventor: Ernst M. Faigle, Dryden, Mich.

[73] Assignee: TRW Vehicle Safety Systems Inc., Lyndhurst, Ohio

[21] Appl. No.: 09/111,510

[22] Filed: Jul. 8, 1998

[51] Int. Cl.$^7$ ............................. B60N 2/42; B60R 21/00
[52] U.S. Cl. ............................. 297/216.13; 297/216.1; 297/216.14
[58] Field of Search ......................... 297/216.13, 216.14, 297/216.1, 472, 471, 470

[56] References Cited

U.S. PATENT DOCUMENTS

| | | |
|---|---|---|
| 2,102,979 | 12/1937 | Smith . |
| 2,796,112 | 6/1957 | Barsky . |
| 3,877,748 | 4/1975 | Eggert ................................. 297/216.1 |
| 5,203,600 | 4/1993 | Watanabe et al. . |
| 5,219,202 | 6/1993 | Rink et al. ......................... 297/216.13 |
| 5,286,058 | 2/1994 | Wier ................................... 297/472 X |
| 5,328,234 | 7/1994 | Daniel et al. ..................... 297/216.16 |
| 5,490,706 | 2/1996 | Totani ............................ 297/216.13 X |
| 5,567,006 | 10/1996 | McCarthy ........................ 297/216.1 X |
| 5,605,372 | 2/1997 | Al-Abdullateef .............. 2977/216.1 X |
| 5,641,198 | 6/1997 | Steffens, Jr. ..................... 297/216.13 |
| 5,676,421 | 10/1997 | Brodsky ............................ 297/216.13 |
| 5,697,478 | 12/1997 | Di Stefano ..................... 297/216.1 X |
| 5,833,312 | 11/1998 | Lenz ................................... 297/216.13 |

FOREIGN PATENT DOCUMENTS

WO 97/10117  3/1997  WIPO .

Primary Examiner—Peter M. Cuomo
Assistant Examiner—Rodney B. White
Attorney, Agent, or Firm—Tarolli, Sundheim, Covell, Tummino & Szabo L.L.P.

[57] ABSTRACT

An apparatus (10) includes a seat back (16), a seat bottom (18), and a vehicle occupant protection apparatus (20). The protection apparatus (20) supports the seat back (16) on the seat bottom (18) for pivotal movement relative to the seat bottom (181), and blocks pivotal movement of the seat back (16) until the occurrence of a vehicle crash. The protection apparatus (20) then dissipates vehicle crash energy by continuously retarding pivotal movement of the seat back (16) relative to the seat bottom (18) under the influence of vehicle crash forces.

19 Claims, 3 Drawing Sheets

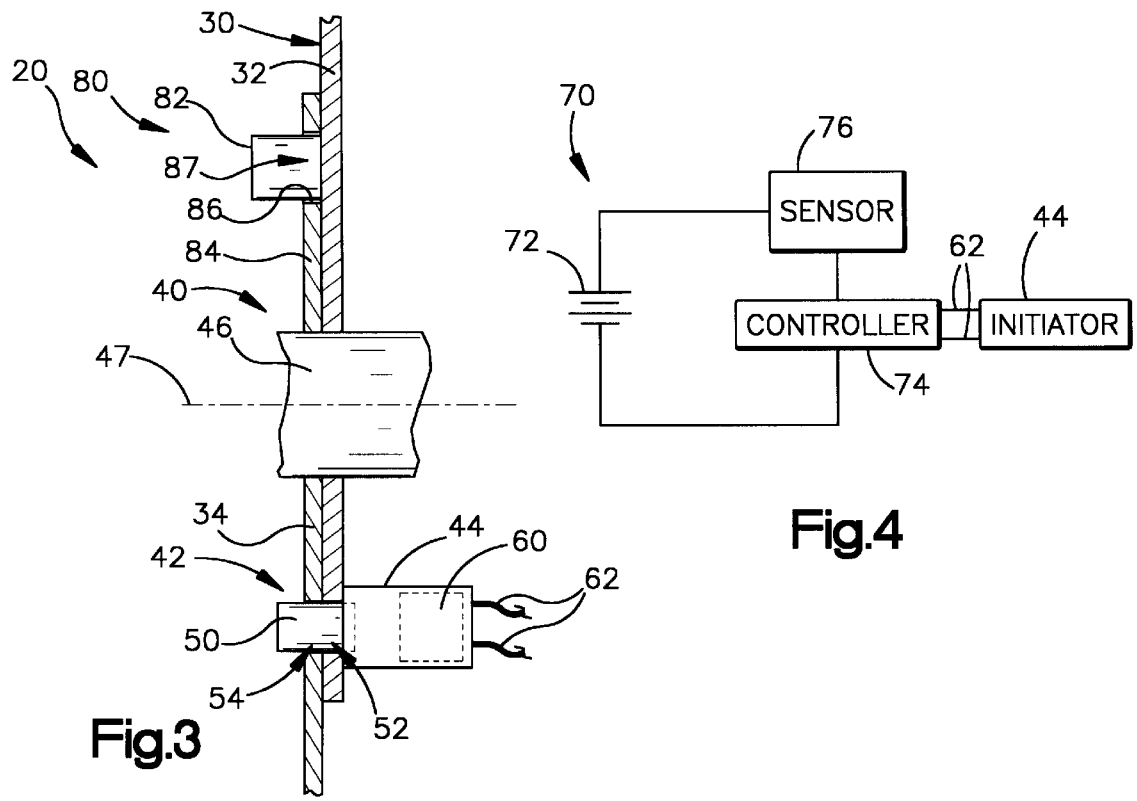
Fig.3
Fig.4
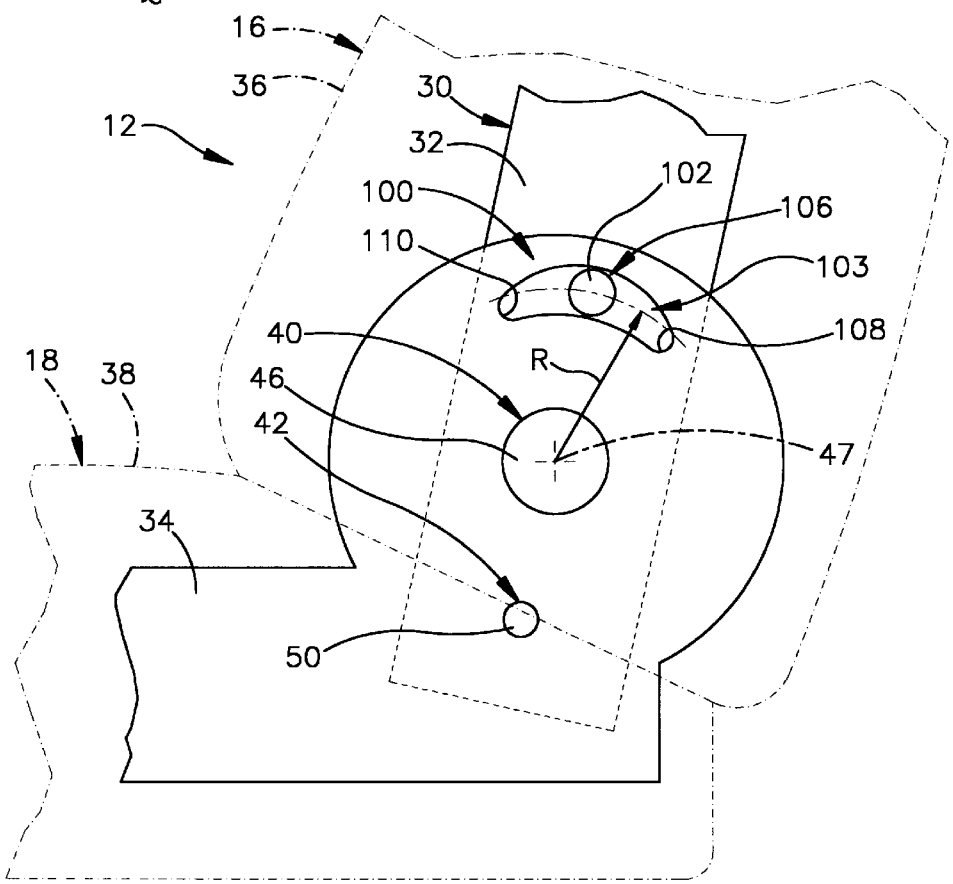
Fig.5

VEHICLE OCCUPANT PROTECTION APPARATUS

FIELD OF THE INVENTION

The present invention relates to an apparatus for helping to protect an occupant of a vehicle seat upon the occurrence of a vehicle crash.

BACKGROUND OF THE INVENTION

A seat in a vehicle includes a seat back and a seat bottom. When the vehicle experiences a crash, crash forces tend to move an occupant of the seat relative to the seat. For example, the vehicle may experience a crash in which an impact is directed against the rear end of the vehicle. Crash forces then act against the vehicle in a forward direction. Such crash forces may cause the occupant to move relative to the seat back in a rearward direction, and thereby to move forcefully against the seat back.

The vehicle may also experience a crash in which an impact is directed against the front end of the vehicle. Crash forces then act against the vehicle in a rearward direction. Such crash forces may cause the occupant initially to experience inertial movement away from the seat back in a forward direction, and subsequently to experience rebound movement toward the seat back in a rearward direction. Accordingly, vehicle crash forces may move an occupant of a vehicle seat forcefully against the seat back in either a front impact crash or a rear impact crash.

SUMMARY OF THE INVENTION

In accordance with a principal feature of the present invention, an apparatus comprises a seat back, a seat bottom, and a vehicle occupant protection apparatus. The protection apparatus comprises means for supporting the seat back on the seat bottom for pivotal movement relative to the seat bottom. The protection apparatus further comprises means for blocking pivotal movement of the seat back relative to the seat bottom until the occurrence of a vehicle crash, and means for dissipating vehicle crash energy by continuously retarding pivotal movement of the seat back relative to the seat bottom under the influence of vehicle crash forces.

In accordance with another principal feature of the present invention, an apparatus comprises a seat back, a seat bottom, and a bearing supporting the seat back on the seat bottom for pivotal movement relative to the seat bottom. The apparatus further comprises means for dissipating vehicle crash energy by retarding pivotal movement of the seat back relative to the seat bottom under the influence of vehicle crash forces. The means for dissipating vehicle crash energy blocks rebound pivotal movement of the seat back relative to the seat bottom.

BRIEF DESCRIPTION OF THE DRAWINGS

The foregoing and other features of the present invention will become apparent to one skilled in the art to which the present invention relates upon reading the following description of the invention with reference to the accompanying drawings, wherein:

FIG. 3 is a view taken on line 3—3 of FIG. 2;

FIG. 4 is a schematic view of an electrical circuit including parts of the apparatus of FIG. 1;

FIG. 5 is a view similar to FIG. 2 showing parts of an apparatus comprising a second embodiment of the present inventions and FIG. 6 is a view similar to FIG. 5 showing parts of an apparatus comprising a third embodiment of the present invention.

DESCRIPTION OF PREFERRED EMBODIMENTS

Figure 1:
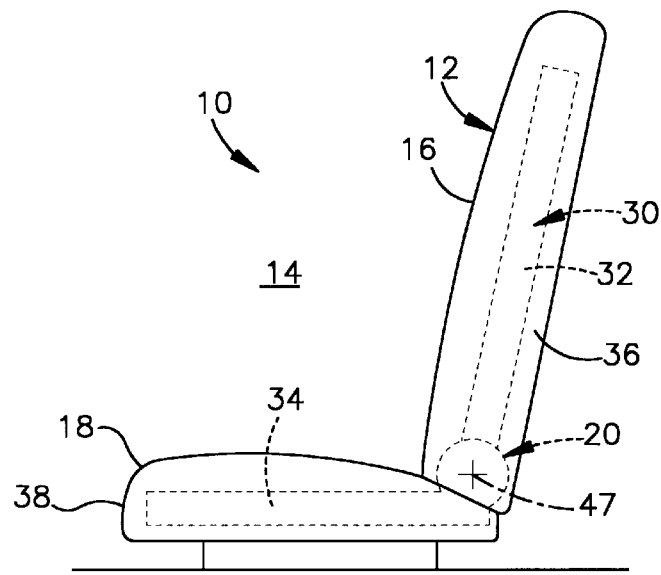
FIG. 1 is a side view of an apparatus comprising a first embodiment of the present invention, with certain parts being shown schematically.

An apparatus 10 comprising a first embodiment of the present invention is shown partially in FIG. 1. The apparatus 10 includes a vehicle seat 12 in a vehicle occupant compartment 14. The seat 12 includes a seat back 16 and a seat bottom 18. When the vehicle experiences a crash, crash forces may cause an occupant of the seat 12 to move against the seat back 16. In accordance with the present invention, the seat 12 is equipped with an apparatus 20 that helps to protect the occupant by dissipating energy when crash forces move the occupant against the seat back 16.

The seat 12 has a frame 30 with an upper section 32 and a lower section 34. The seat back 16 is defined in part by the upper section 32 of the frame 30 and in part by a back cushion 36 which covers the upper section 32 of the frame 30. The seat bottom 18 is similarly defined in part by the lower section 34 of the frame 30 and in part by a bottom cushion 38 which covers the lower section 34 of the frame 30.

Figure 2:
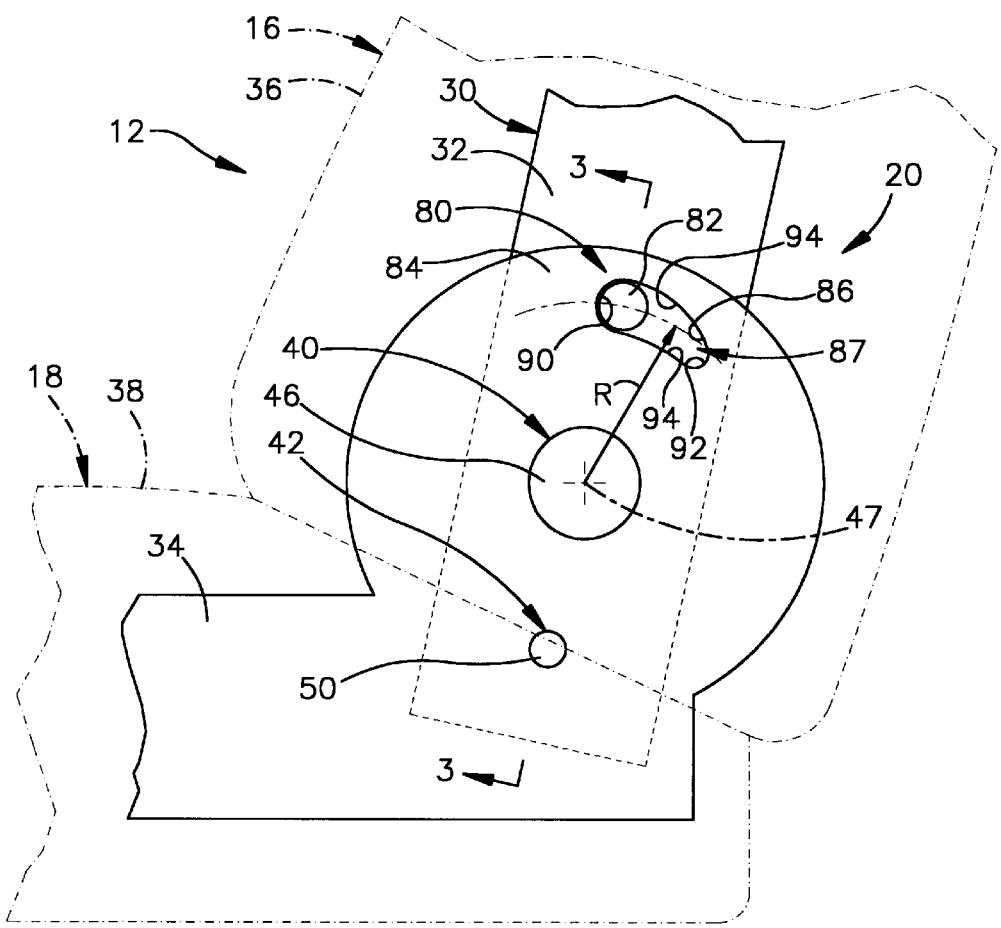
FIG. 2 is an enlarged partial view of parts of the apparatus of FIG. 1.

As shown in FIGS. 2 and 3, the protection apparatus 20 includes a bearing 40, a lock 42, and a release device 44 (FIG. 3). The bearing 40 in the first embodiment of the present invention comprises a shaft 46. The shaft 46 supports the upper section 32 of the frame 30 on the lower section 34 for movement relative to the lower section 34 pivotally about a horizontal axis 47. The seat back 16 is thus pivotal about the axis 47 relative to the seat bottom 18.

The lock 42 blocks pivotal movement of the seat back 16 under ordinary vehicle operating conditions. The lock 42 in the first embodiment of the invention comprises a lock bar 50. As shown in FIG. 3, the lock bar 50 is installed on the frame 30 in a position extending through aligned apertures 52 and 54 in the upper and lower sections 32 and 34 of the frame 30, respectively, so as to block the upper section 32 from moving pivotally about the axis 47 relative to the lower section 34.

The release device 44 is actuatable to eject the lock bar 50 from its installed position upon the occurrence of a vehicle crash. As shown schematically in FIG. 3, the release device 44 in the first embodiment is an electrically actuatable initiator containing a small charge of pyrotechnic material 60. The pyrotechnic material 60 is ignited in a known manner upon the passage of electric current through the initiator 44 between a pair of electrical leads 62 projecting from the initiator 44.

As shown schematically in FIG. 4, the initiator 44 is connected in an electrical circuit 70 with a power source 72, a controller 74, and a sensor 76. The power source 72 preferably comprises the vehicle battery and/or a capacitor. The controller 74 may comprise any suitable microprocessor known in the art. The sensor 76 senses one or more vehicle conditions indicating the occurrence of a crash. Such a sensor also is known in the art.

The sensor 76 may sense a crash-indicating condition that meets or exceeds a predetermined threshold level of severity for which the protection apparatus 20 is desired to help protect an occupant of the seat 12. If so, the controller 74 responds by actuating the initiator 44. Preferably, the controller 74 uses known algorithms to discriminate front impact crash conditions and rear impact crash conditions sensed by the sensor 76. If a front or rear impact crash condition meets or exceeds a corresponding threshold level of severity, the controller 74 responds by directing electric current between the leads 62 to ignite the pyrotechnic material 60 in the initiator 44.

When the pyrotechnic material 60 is ignited, it rapidly produces gases that develop a thrust against the locking pin 50. The locking pin 50 is then propelled from the apertures 52 and 54 in the upper and lower sections 32 and 34 of the frame 30. The seat back 16 (FIG. 1) is thus released to pivot relative to the seat bottom 18.

The protection apparatus 20 further includes a brake 80. In the first embodiment of the present invention, the brake 80 includes a pin 82 which is fixed to the upper section 32 of the frame 30. An adjacent portion 84 of the lower section 34 has an inner edge surface 86 defining a slot 87. The slot 87 has an arcuate configuration with a radius of curvature R (FIG. 2) centered on the axis 47. Moreover, the slot 87 tapers progressively from a wide end 90 to a narrow end 92. The pin 82 projects through the slot 87.

As described above, the lock 42 retains the seat back 16 in the position of FIG. 1 under ordinary vehicle operating conditions. The pin 82 is then located in an initial position at the wide end 90 of the slot 87, as shown in FIG. 2. When the initiator 44 has been actuated upon the occurrence of a vehicle crash, crash forces applied by an occupant of the seat 12 may cause the seat back 16 to pivot about the axis 47 in a clockwise direction, as viewed in FIG. 2. The pin 82 will then move toward the narrow end 92 of the slot 87. However, the tapered configuration of the slot 87 causes the pin 82 to move against converging opposite side portions 94 of the inner edge surface 86 immediately upon moving from the initial position at the wide end 90 of the slot 87. Thus, as the pin 82 moves from the wide end 90 of the slot 87 toward the narrow end 92, the pin 82 moves in a continuously tightening interference fit with the lower frame section 34. The continuously tightening interference is established in part by friction between the pin 82 and the lower frame section 34 and in part by deformation of the metal material of the lower frame section 34 adjacent to the slot 87. The vehicle crash forces that pivot the seat back 16 about the axis 47 are thereby resisted continuously by a retarding force of the brake 80, with the retarding force increasing continuously as the seat back 16 pivots about the axis 47. Forces then act through distances such that work is performed and energy is dissipated. More specifically, kinetic energy of the vehicle occupant is dissipated to help protect the occupant from injury.

Further in accordance with the present invention, the slot 87 in the lower frame section 34 is configured such that the interference fit between the pin 82 and the lower frame section 34 is tight enough to block rebound movement of the seat back 16 toward the position of FIGS. 1 and 2 under the influence of the vehicle crash forces acting on the seat 12.

A second embodiment of the present invention is shown partially in FIG. 5. The second embodiment has many parts that are substantially the same as corresponding parts of the first embodiment. This is indicated by the use of the same reference numbers for such corresponding parts in FIGS. 5 and 2. The second embodiment further includes an alternative brake 100 in place of the brake 80.

The alternative brake 100 includes a pin 102 projecting from the upper frame section 32 through a tapered slot 103 in the lower frame section 34. Like the slot 87 described above, the slot 103 has an arcuate configuration with a radius of curvature R centered on the axis 47. However, the slot 103 has a wide central portion 106 and a pair of narrow opposite ends 108 and 110. The lock 42 in the second embodiment releasably retains the pin 102 in an initial position at the central portion 106 of the slot 103.

When the upper frame section 32 is released to pivot about the axis 47 upon the occurrence of a vehicle crash, the pin 102 can move toward the rear end 108 of the slot 103. This may occur when an occupant of the seat 12 moves against the seat back 16 to pivot the seat back 16 in a rearward direction. The pin 102 can alternatively move toward the front end 110 of the slot 103. This may occur when a vehicle occupant behind the seat 12 moves against the seat back 16 to pivot the seat back 16 in a forward direction. Such forward movement of the seat back 16 could be permitted or timed by the controller 74 to accommodate an occupant of the seat 12. The alternative brake 100 can thus retard pivotal movement of the seat back 16 so as to dissipate vehicle crash energy for protection of a vehicle occupant behind the seat 12 as well as for protection of an occupant of the seat 12. In each case, the continuously tightening interference fit achieved by the alternative brake 100 blocks rebound pivotal movement of the seat back 16 under the influence of the vehicle crash forces acting on the seat 12.

Figure 6:
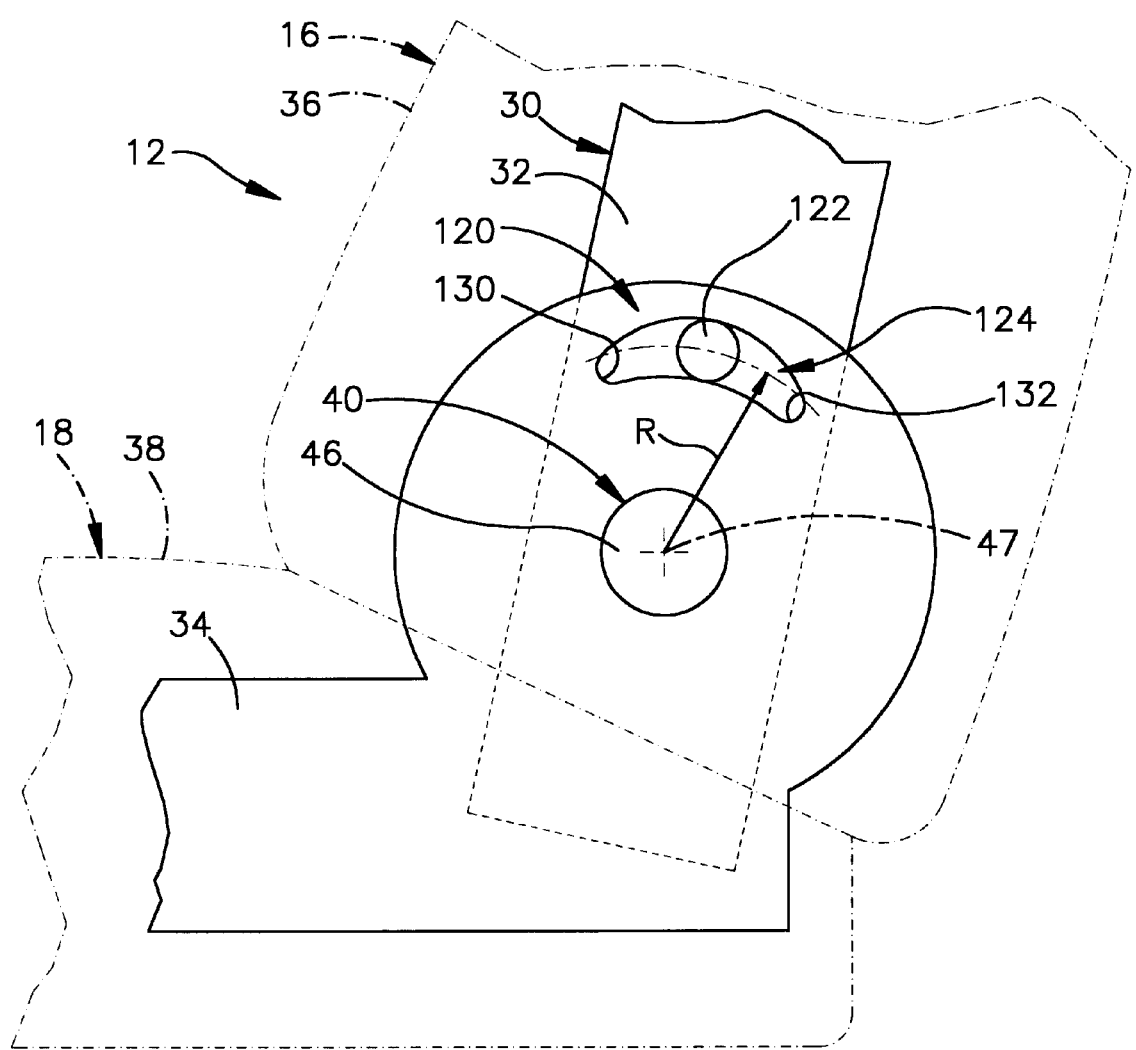

A third embodiment of the present invention is shown partially in FIG. 6. The third embodiment has many parts that are substantially the same as corresponding parts of the second embodiment. This is indicated by the use of the same reference numbers for such corresponding parts in FIGS. 6 and 5. However, although the second embodiment includes the lock 42, the third embodiment does not include such a lock. This is because the third embodiment includes an alternative brake 120 which initially retains the seat back 36 in an interference fit with the seat bottom 38. The initial interference fit is tight enough to block pivotal movement of the seat back 36 relative to the seat bottom 38 under the influence of a force that is less than a predetermined threshold vehicle crash force.

Specifically, the alternative brake 120 in the third embodiment of the invention includes a pin 122 projecting from the upper frame section 32 through a tapered slot 124 in the lower frame section 34. The slot 124 has the same size and configuration as the slot 103 in the second embodiment. The pin 122 is diametrically larger than the pin 102. This enables the pin 122 to engage the lower frame section 34 in an initial interference fit at an initial position spaced from the opposite ends 130 and 132 of the slot 124. When a vehicle crash force of at least a predetermined threshold level urges the seat back 16 to pivot about the axis 47, the initial interference fit is overcome. The pin 122 is then moved in the slot 124 in a continuously tightening interference fit with the lower frame section 34 as the seat back 16 move pivotally about the axis 47. As in the first and second embodiments of the invention, the continuously tightening interference fit in the third embodiment blocks rebound movement of the seat back 16 pivotally about the axis 47 under the influence of the vehicle crash forces acting on the seat 12.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for supporting an occupant of a vehicle, said apparatus comprising:

a seat back;

a seat bottom; and a vehicle occupant protection apparatus comprising means for supporting said seat back on said seat bottom for pivotal movement relative to said seat bottom, means for blocking pivotal movement of said seat back relative to said seat bottom until an occurrence of a vehicle crash of said vehicle, and means for dissipating vehicle crash energy of said vehicle by continuously retarding pivotal movement of said seat back relative to said seat bottom under an influence of vehicle crash forces of said vehicle, said energy dissipating means including means for blocking rebound pivotal movement of said seat back relative to said seat bottom.

2. Apparatus as defined in claim 1 wherein said energy dissipating means applies a retarding force to said seat back which continuously increases as said seat back pivots relative to said seat bottom under the influence of said vehicle crash forces.

3. Apparatus as defined in claim 1 wherein said protection apparatus defines a limited range through which said seat back is pivotal relative to said seat bottom under the influence of said vehicle crash forces, and said blocking means retains said seat back in an initial position between opposite ends of said limited range until said occurrence of said vehicle crash.

4. Apparatus for supporting an occupant of a vehicle, said apparatus comprising:

a seat back;

a seat bottom;

a bearing supporting said seat back on said seat bottom for pivotal movement relative to said seat bottom;

a releasable lock in engagement with said seat back to block pivotal movement of said seat back relative to said seat bottom;

a device that is actuatable to release said lock from said engagement with said seat back upon an occurrence of a vehicle crash of said vehicle; and means for dissipating vehicle crash energy of said vehicle by continuously retarding pivotal movement of said seat back relative to said seat bottom under an influence of vehicle crash forces of said vehicle, said energy dissipating means defining a limited range through which said seat back is pivotal relative to said seat bottom under the influence of said vehicle crash forces, said releasable lock retaining said seat back in an initial position between opposite ends of said limited range until said occurrence of said vehicle crash of said vehicle.

5. Apparatus as defined in claim 4 wherein said energy dissipating means applies a retarding force to said seat back which continuously increases as seat back pivots relative to said seat bottom under the influence of said vehicle crash forces.

6. Apparatus as defined in claim 1 wherein said energy dissipating means includes means for blocking rebound pivotal movement of said seat back relative to said seat bottom under the influence of said vehicle crash forces.

7. Apparatus for supporting an occupant of a vehicle, said apparatus comprising:

a seat back;

a seat bottom;

a bearing supporting said seat back on said seat bottom for pivotal movement relative to said seat bottom;

a releasable lock in engagement with said seat back to block said pivotal movement of said seat back;

a device that is actuatable to release said lock from said engagement with said seat back upon an occurrence of a vehicle crash of said vehicle; and a brake which continuously retards said pivotal movement of said seat back, whereby vehicle crash energy of said vehicle is continuously dissipated when vehicle crash forces of said vehicle pivot said seat back against the retarding force of said brake, said brake being configured to block rebound pivotal movement of said seat back relative to said seat bottom under an influence of said vehicle crash forces.

8. Apparatus as defined in claim 7 wherein said brake is configured to define a limited range through which said seat back is pivotal relative to said seat bottom under the influence of said vehicle crash forces and said lock retains said seat back in an initial position between opposite ends of said limited range until said occurrence of said vehicle crash.

9. Apparatus as defined in claim 7 wherein said brake continuously applies said retarding force as seat back pivots relative to said seat bottom under the influence of said vehicle crash forces.

10. Apparatus as defined in claim 9 wherein said brake comprises a pair of parts that are configured to move in a continuously tightening interference fit with each other as said seat back pivots relative to said seat bottom under the influence of said vehicle crash forces.

11. Apparatus as defined in claim 10 wherein one of said parts is a pin, the other of said parts defining a tapered slot in which said pin is movable in said continuously tightening interference fit.

12. Apparatus for supporting an occupant of a vehicle, said apparatus comprising:

a seat back;

a seat bottom;

a bearing supporting said seat back on said seat bottom for pivotal movement relative to said seat bottom; and means for dissipating vehicle crash energy of said vehicle by retarding pivotal movement of said seat back relative to said seat bottom under an influence of vehicle crash forces of said vehicle;

said energy dissipating means including means for blocking rebound pivotal movement of said seat back relative to said seat bottom under the influence of said vehicle crash forces.

13. Apparatus as defined in claim 12 wherein said energy dissipating means defines a limited range through which said seat back is pivotal relative to said seat bottom under the influence of said vehicle crash forces and retains said seat back in an initial position between opposite ends of said limited range until an occurrence of a vehicle crash of said vehicle.

14. Apparatus as defined in claim 12 wherein said energy dissipating means continuously retards said pivotal movement of said seat back under the influence of said vehicle crash forces.

15. Apparatus as defined in claim 12 wherein said energy dissipating means initially retains said seat back in an initial interference fit with said seat bottom, said interference fit being tight enough to block pivotal movement of said seat back relative to said seat bottom under the influence of a force less than a predetermined threshold vehicle crash force.

16. Apparatus as defined in claim 15 wherein said energy dissipating means supports said seat back to move in a continuously tightening interference fit with said seat bottom upon said pivotal movement of said seat back relative to said seat bottom under the influence of said vehicle crash forces.

17. Apparatus for supporting an occupant of a vehicle, said apparatus comprising:

a seat back;

a seat bottom;

a bearing supporting said seat back on said seat bottom for pivotal movement relative to said seat bottom; and a pair of parts establishing an initial interference fit between said seat back and said seat bottom, said initial interference fit being tight enough to block pivotal movement of said seat back relative to said seat bottom under an influence of a force to said vehicle less than a predetermined threshold vehicle crash force;

said pair of parts being configured to establish a continuously tightening interference fit between said seat back and said seat bottom as said seat back pivots relative to said seat bottom under an influence of vehicle crash forces of said vehicle equal to or greater than said threshold vehicle crash force.

18. Apparatus as defined in claim 17 wherein one of said parts is a pin and the other of said parts defines a tapered slot in which said pin is movable in said continuously tightening interference fit.

19. Apparatus as defined in claim 18 wherein said continuously tightening interference fit blocks rebound pivotal movement of said seat back relative to said seat bottom under the influence of said vehicle crash forces.

* * * * *